United States Patent
Youtz et al.

(10) Patent No.: US 12,028,757 B2
(45) Date of Patent: *Jul. 2, 2024

(54) SYSTEMS AND METHODS FOR NETWORK-IMPLEMENTED CELL SELECTION IN A WIRELESS NETWORK BASED ON UE MEASUREMENT REPORTS

(71) Applicant: Verizon Patent and Licensing Inc., Basking Ridge, NJ (US)

(72) Inventors: Andrew E. Youtz, Princeton, NJ (US); Hui Zhao, Marlboro, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 399 days.

This patent is subject to a terminal disclaimer.

(21) Appl. No.: 17/559,502

(22) Filed: Dec. 22, 2021

(65) Prior Publication Data

US 2022/0150765 A1 May 12, 2022

Related U.S. Application Data

(63) Continuation of application No. 16/718,657, filed on Dec. 18, 2019, now Pat. No. 11,240,713.

(51) Int. Cl.
*H04W 4/00* (2018.01)
*H04W 36/00* (2009.01)
*H04W 76/27* (2018.01)

(52) U.S. Cl.
CPC ... *H04W 36/0058* (2018.08); *H04W 36/0022* (2013.01); *H04W 36/0072* (2013.01); *H04W 36/00835* (2018.08); *H04W 76/27* (2018.02)

(58) Field of Classification Search
CPC ......... H04W 36/0005; H04W 36/0016; H04W 36/0058; H04W 36/0061; H04W 36/0072; H04W 36/0079; H04W 36/0083; H04W 36/00835; H04W 36/00837; H04W 36/0085; H04W 36/0088; H04W 36/0094; H04W 76/00; H04W 76/10; H04W 76/30; H04W 76/38
See application file for complete search history.

(56) References Cited

U.S. PATENT DOCUMENTS

| | | |
|---|---|---|
| 9,237,502 B1 | 1/2016 | Pawar et al. |
| 2009/0067386 A1 | 3/2009 | Kitazoe |
| 2011/0195707 A1 | 8/2011 | Faerber et al. |
| 2012/0040676 A1 | 2/2012 | Jang et al. |
| 2012/0275320 A1 | 11/2012 | Iyer |
| 2019/0166636 A1 | 5/2019 | Sahu et al. |

*Primary Examiner* — Matthew W Genack

(57) ABSTRACT

A system described herein may provide a technique for ensuring that a User Equipment ("UE") is provided an opportunity to scan for available cells in a wireless network in a manner that allows the UE to detect cells according to a particular radio frequency ("RF") band. When receiving a measurement report from the UE that does not include cells implementing the particular RF band, a timer may be initiated during which subsequent measurement reports may be received from the UE. If a subsequent measurement from the UE includes a cell corresponding to the particular RF band, the UE may be instructed to connect to such a cell. Otherwise, the UE may be instructed to connect to another cell that does not implement the particular RF band.

20 Claims, 13 Drawing Sheets

SYSTEMS AND METHODS FOR NETWORK-IMPLEMENTED CELL SELECTION IN A WIRELESS NETWORK BASED ON UE MEASUREMENT REPORTS

CROSS-REFERENCE TO RELATED APPLICATION

This Application is a Continuation of U.S. patent application Ser. No. 16/718,657, filed on Dec. 18, 2019, titled "SYSTEMS AND METHODS FOR NETWORK-IMPLEMENTED CELL SELECTION IN A WIRELESS NETWORK BASED ON UE MEASUREMENT REPORTS," the contents of which are herein incorporated by reference in their entirety.

BACKGROUND

Wireless user equipment ("UE"), such as mobile telephones or other wireless communication devices, may communicate with one or more wireless networks, such as a wireless telecommunications network. In order to identify the presence of cells or other components of the wireless network, a UE may perform radio frequency ("RF") scans. UEs may perform scans on different RF bands in order to identify components that operate at different RF bands and/or utilize different radio access technologies ("RATs").

DETAILED DESCRIPTION OF THE PREFERRED EMBODIMENTS

The following detailed description refers to the accompanying drawings. The same reference numbers in different drawings may identify the same or similar elements.

Embodiments described herein provide for the radio frequency ("RF") scanning of cells (and/or other RF components) of a wireless network in a manner that prioritizes the use of particular radio access technologies ("RATs"), RF bands, RF sub-bands, etc., that are implemented by cells of the wireless network. As used herein, the term "band" may be used for the sake of conciseness to refer to different RATs, RF bands, RF sub-bands, etc. For instance, cells of the wireless network may implement a Long-Term Evolution ("LTE") RAT, a first portion of a Fifth Generation ("5G") New Radio ("NR") RAT (e.g., a "Sub-6 GHz" band), a second portion of the 5G NR RAT (e.g., a "millimeter-wave" or "mmWave" band), and/or other bands, sub-bands, or RATs.

In some situations, it may be beneficial for a UE to connect to cells that implement bands that provide relatively high throughput, low latency, etc. (e.g., cells that implement the mmWave band). In some situations, it may be beneficial for a UE to connect to cells that implement bands that offer relatively high coverage area (e.g., cells that implement the Sub-6 GHz band, an LTE band, etc.). While a UE may be instructed to scan for and prioritize cells that implement a preferred band, in practice, the UE may not scan for and/or prioritize cells in such a manner. For example, the UE may be configured to ignore such instructions, and/or may attempt to scan according to such instructions but may locate cells that implement other bands before locating cells that implement a preferred band.

As described herein, some embodiments may utilize one or more timers to account for situations in which a UE may be within range of a cell that implements a preferred band, but also detects cells that implement other bands (e.g., provides measurement reports for cells that implement other bands before providing measurement reports for cells that implement the preferred band).

Figure 1:
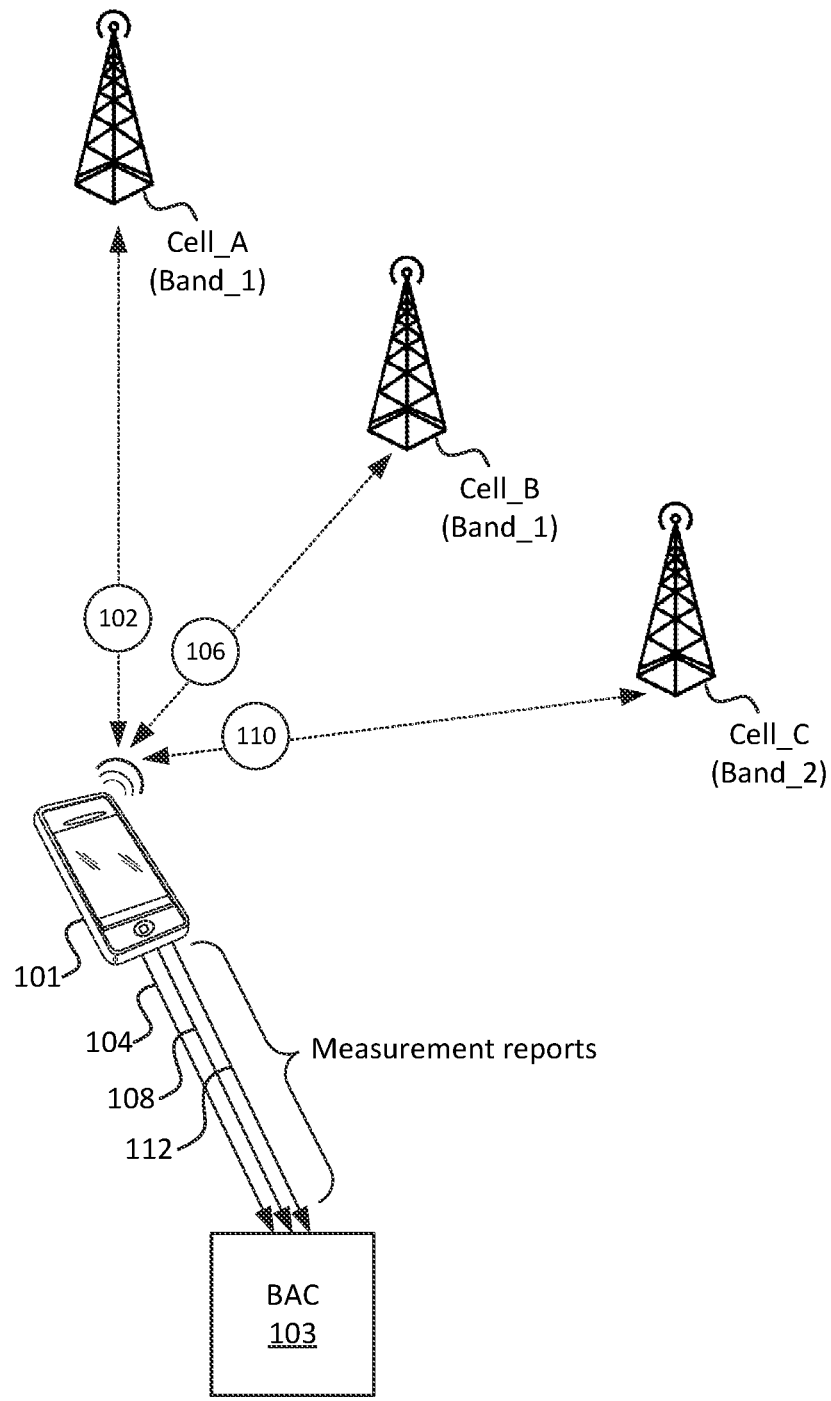
FIG. 1 illustrates an example of a User Equipment ("UE") providing measurement reports, corresponding to multiple cells of a wireless network, to a Band Assistance Component ("BAC"), in accordance with some embodiments.

As shown in FIG. 1, for example, UE 101 may perform one or more scans for cells of a wireless network (i.e., Cell_A, Cell_B, and Cell_C, in this example). The scans may be performed based on timing information and/or RF band information by the wireless network (e.g., where the timing information and/or RF band information may be used by UE 101 to locate (e.g., in a time-and-frequency domain) a pilot signal, a Master Information Block ("MIB"), a System Information Block ("SIB"), etc., broadcasted by the cells). For example, the wireless network (e.g., a cell of the wireless network to which UE 101 is currently connected, or "anchored") may provide a Neighbor Cell List ("NCL") that indicates timing information and/or RF band information that may be used by UE 101 to locate Cell_A, Cell_B, and Cell_C. In this example, Cell_A and Cell_B implement Band_1 (which may be, for example, a Sub-6 GHz band), and Cell_C implements Band_2 (which may be, for example, a mmWave band). Assume for the purposes of FIGS. 1-6D that Band_2 is a "preferred" band (e.g., a band to which UE 101 should connect if available).

In some embodiments, in lieu of an NCL, a list or group of cells (e.g., not necessarily "neighbor" cells) may be used. For the sake of brevity, the term "NCL" is used herein. However, in some embodiments, similar concepts may apply to other lists or groups of cells (e.g., cells which are not necessarily "neighbor" cells).

In the example shown in FIG. 1, UE 101 may scan for and/or locate (at 102) Cell_A, and may provide (at 104) a measurement report (indicating one or more measures of signal quality between UE 101 and Cell_A, such as Signal-to-Interference-and-Noise-Ratio ("SINR"), Received Signal Strength Indicator ("RSSI"), and/or one or more other metrics) to one or more elements of the wireless network. As shown here, Band Assistance Component ("BAC") 103 may receive the measurement report. As further shown, UE 101 may subsequently scan for and/or locate (at 106) Cell_B, and output (at 108) a measurement report to BAC 103 (e.g., indicating a measure of signal quality between UE 101 and Cell_B). As additionally shown, UE 101 may subsequently scan for and/or locate (at 110) Cell_C, and output (at 112) a corresponding measurement report to BAC 103.

Figure 2:
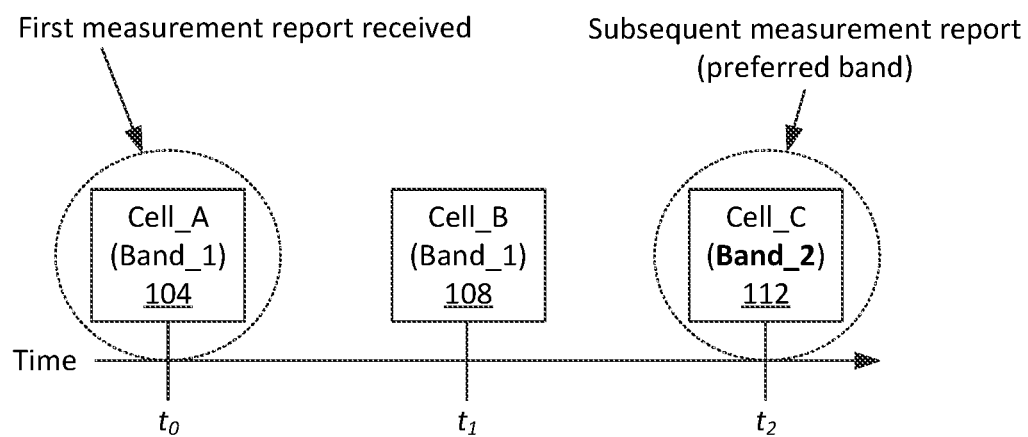
FIG. 2 illustrates an example of a measurement report, for a cell that implements a preferred band, being received from the UE after one or more measurement reports, for one or more cells that do not implement the preferred band, are received from the UE.

As shown in FIG. 2, the above sequence may give rise to the issue that since the measurement report 104 for Cell_A was received (e.g., at time to) before the measurement report 112 for Cell_C, systems that do not utilize the techniques described herein may instruct UE 101 to connect to Cell_A, even if Cell_C is available. As such, the "preferred" band (i.e., Band_2, in these examples) may not be used by UE 101, even though it would have been possible to do so.

Figure 3A:
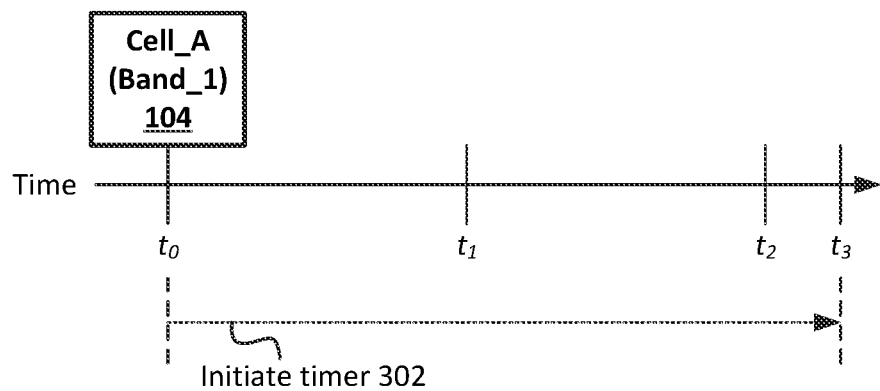
FIGS. 3A-3C illustrate an example of utilizing a timer, in accordance with some embodiments, to facilitate the connection of the UE to the cell that implements the preferred band, in a situation where measurement reports were received for one or more cells that do not implement the preferred band before a measurement report was received for a cell that implements the preferred band.
Figure 3B:
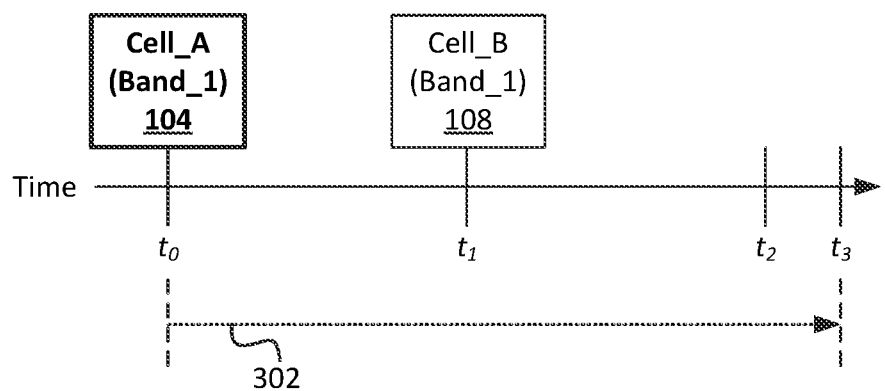
Figure 3C:
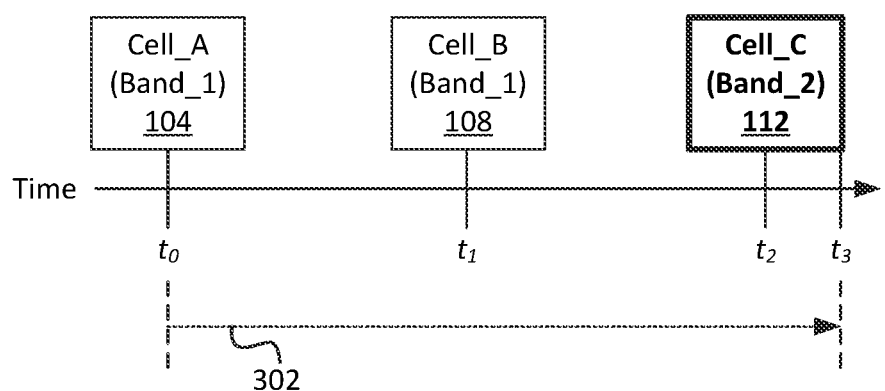

As shown in FIGS. 3A-3C, BAC 103 may use timer 302 to provide an opportunity for measurement reports, associated with the preferred band, to be received after a measurement report is received for another band. For example, as shown in FIG. 3A, at time to, measurement report 104 may be received (e.g., by BAC 103, from UE 101), with signal quality information (and/or other suitable information) associated with Cell_A. Because measurement report 104 does not correspond to a "preferred" band (e.g., does not indicate a cell that implements Band_2), BAC 103 may initiate timer 302. In this example, timer 302 is set to expire at future time t3. As denoted in the figure by the bold lettering as well as the darker border around measurement report 104, BAC 103 may determine that UE 101 should connect to Cell_A unless it is determined that UE 101 should connect to a different cell.

As shown in FIG. 3B, at time t1, measurement report 108 may be received (e.g., while timer 302 is running and prior to expiration of timer 302), with signal quality information (and/or other suitable information) associated with Cell_B. Because measurement report 108 does not correspond to the "preferred" band, timer 302 may continue to run. In this example, BAC 103 may determine that UE 101 should still connect to Cell_A (e.g., because measurement report 104 was received before measurement report 108, and/or based on other factors not explicitly discussed herein).

As shown in FIG. 3C, at time t2, measurement report 112 may be received (e.g., while timer 302 is running and prior to expiration of timer 302), with signal quality information (and/or other suitable information) associated with Cell_C. Because measurement report 112 corresponds to the "preferred" band, BAC 103 may determine that UE 101 should connect to Cell_C, in lieu of Cell_A.

Figure 4:
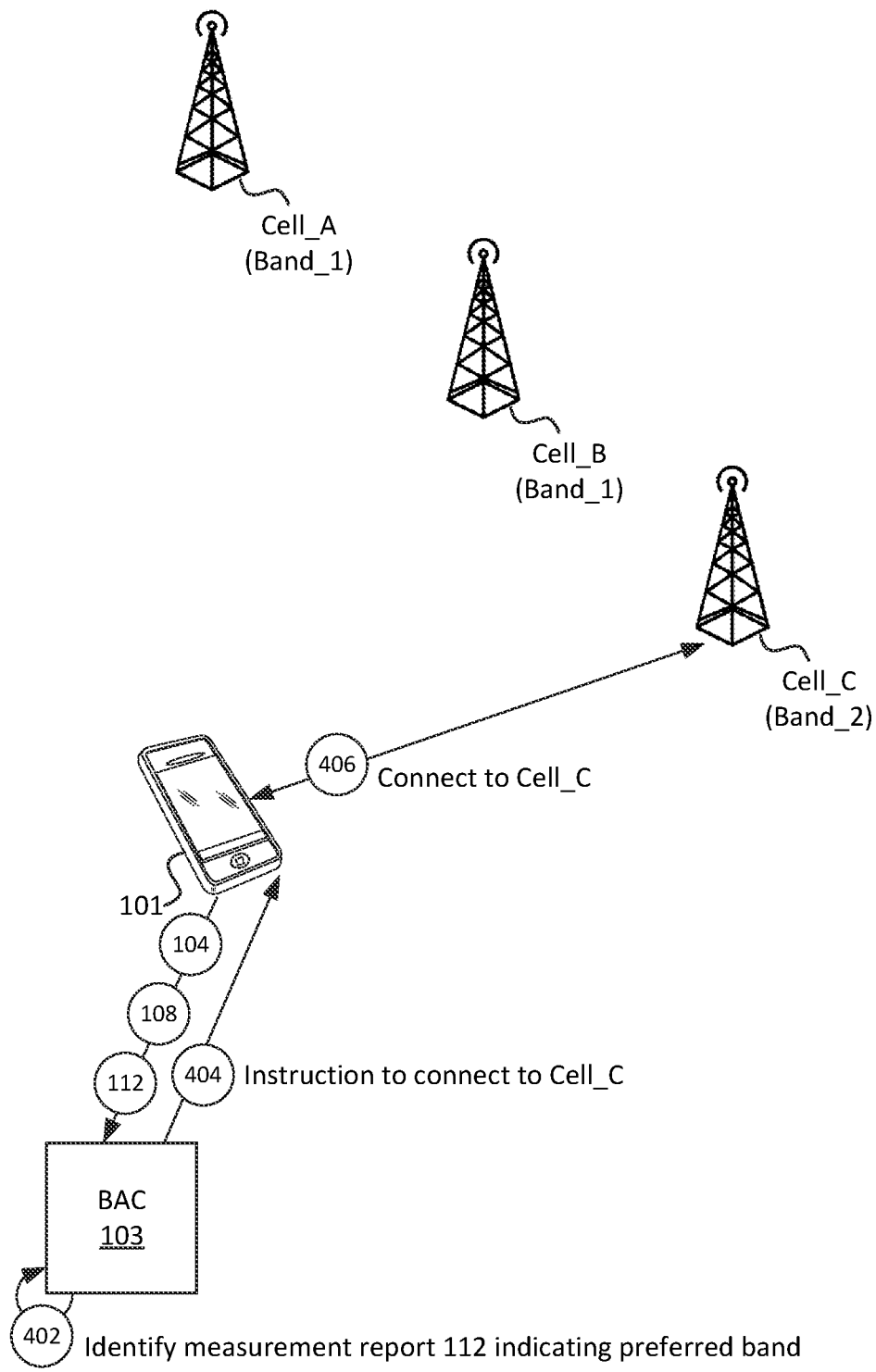
FIG. 4 illustrates an example of the BAC instructing the UE to connect to the cell that implements the preferred band (e.g., as identified based on the techniques described with respect to FIGS. 3A-3C), in accordance with some embodiments.

For example, as shown in FIG. 4, BAC 103 may identify (at 402) that measurement report 112, indicating the preferred band (e.g., Band_2), was received. Based on identifying that a cell that implements the preferred band is available (e.g., is within range of UE 101, as indicated by the measurement report), BAC 103 may instruct (at 404) UE 101 to connect to Cell_C. For example, BAC 103 may send a Radio Resource Control ("RRC") message, such as an RRC Reconfiguration message, that includes an instruction to connect to Cell_C (e.g., where the RRC Reconfiguration message includes an identifier and/or other suitable information that may be used by UE 101 to connect to Cell_C). In some embodiments, BAC 103 may provide the instruction via a cell to which UE 101 is currently anchored, and/or may instruct one or more devices that implement the anchor cell (e.g., one or more evolved Node Bs ("eNBs")) to provide the RRC Reconfiguration message to UE 101. Based on the instruction, UE 406 may initiate (at 406) a procedure to connect to Cell_C (e.g., may communicate with Cell_C using RRC messaging and/or some other suitable messaging).

According to the example above, even though UE 101 provided measurement reports for cells that do not implement the preferred band prior to providing measurement reports that implement the preferred band, embodiments provided herein cause UE 101 to connect to the cell that implements the preferred band, thus ensuring an optimal level of service for UE 101 and a resulting enhanced user experience for a user of UE 101.

Figure 5:
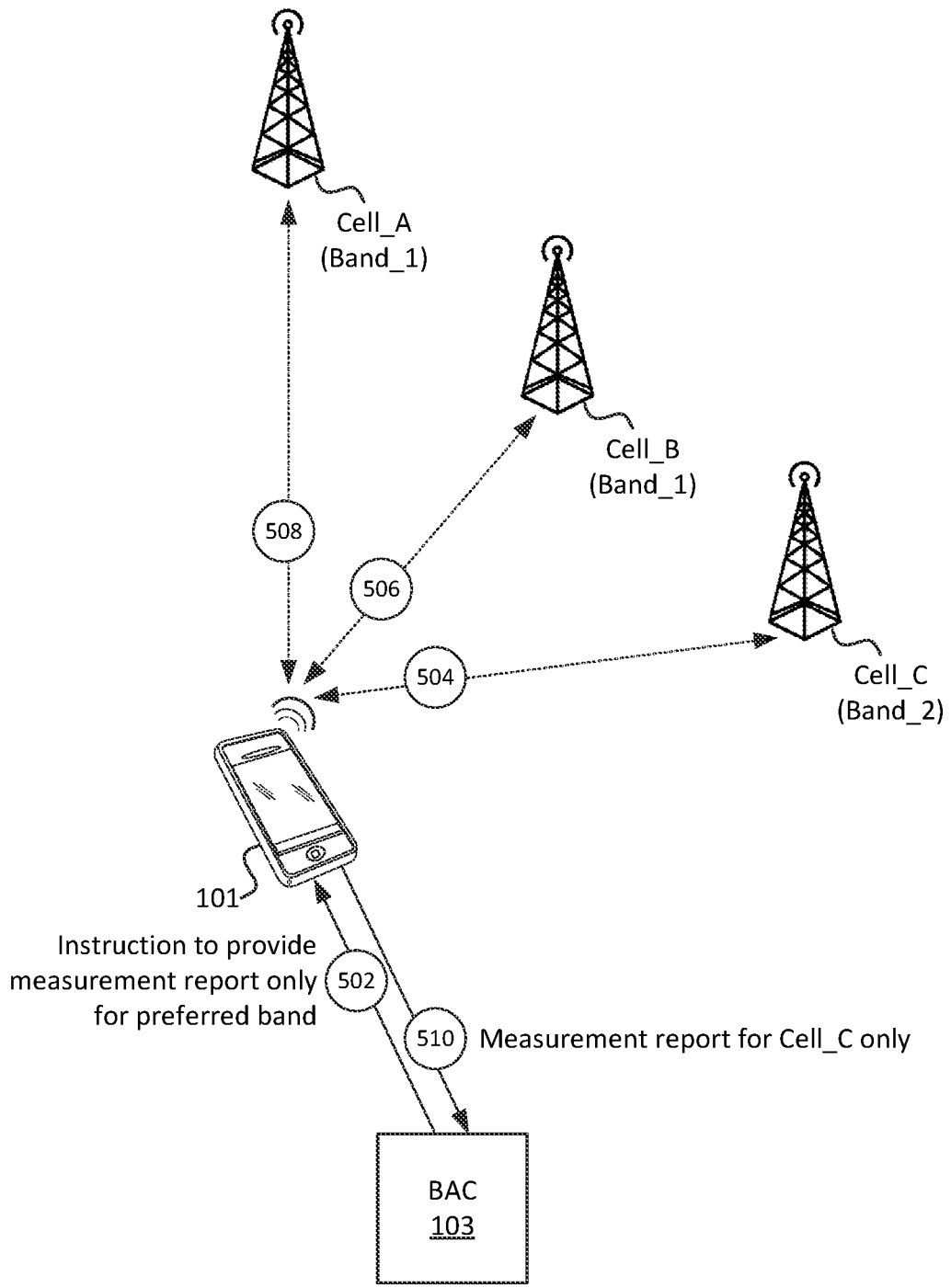
FIG. 5 illustrates an example, in accordance with some embodiments, in which a BAC may instruct a UE to provide measurement reports only for a preferred band, and in which the UE is able to detect a cell that implements the preferred band.

In some embodiments, as shown in FIG. 5, BAC 103 may instruct (at 502) UE 101 to provide measurement reports only for cells that implement a preferred band. For example, BAC 103 may send the instruction via RRC messaging and/or some other suitable form of messaging. In some embodiments, BAC 103 may provide the instruction by providing an NCL that only includes cells that implement the preferred band (e.g., in this example, may provide an NCL that includes Cell_C, and does not include Cell_A or Cell_B). As shown, UE 101 may scan for and/or locate (at 504) for Cell_C. In scenarios where UE 101 receives an NCL that identifies Cell_A and Cell_B (e.g., where UE 101 is otherwise instructed not to provide measurement reports for cells that do not implement the preferred band), UE 101 may also scan for and/or locate (at 506 and 508) Cell_A and Cell_B. Based on the instruction to only provide measurement reports according to the preferred band, UE 101 may provide (at 510) a measurement report for Cell_C to BAC 103 and/or some other suitable device or system (e.g., to a cell to which UE 101 is connected, which may forward some or all of the measurement report to BAC 103). As Cell_C is the only cell for which a measurement report was received in this example, BAC 103 may instruct (not explicitly shown here) UE 101 to connect to Cell_C.

Figure 6A:
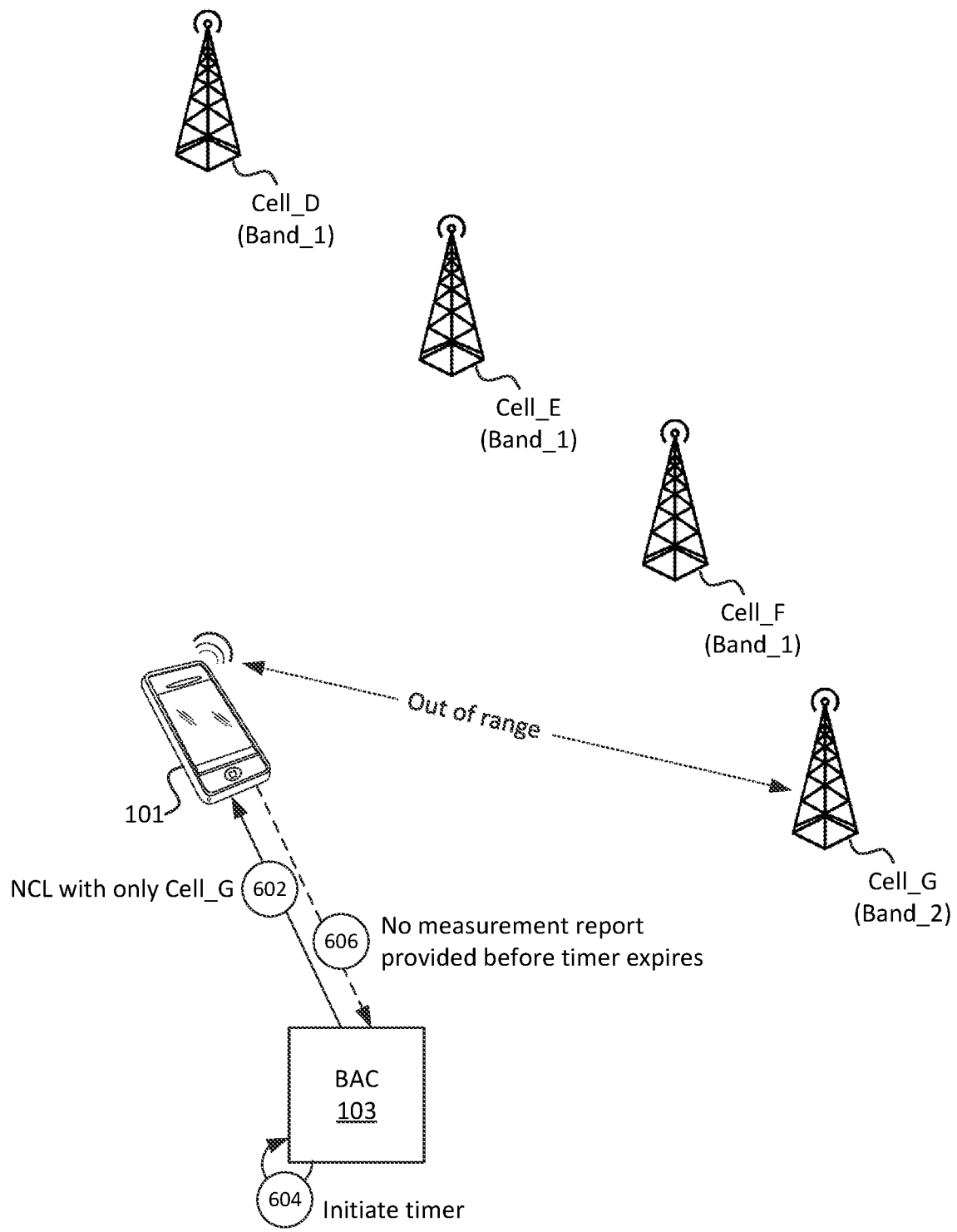
FIGS. 6A-6C illustrate an example, in accordance with some embodiments, in which a BAC may instruct a UE to provide measurement reports only for a preferred band, and in which the UE is not able to detect a cell that implements the preferred band.
Figure 6B:
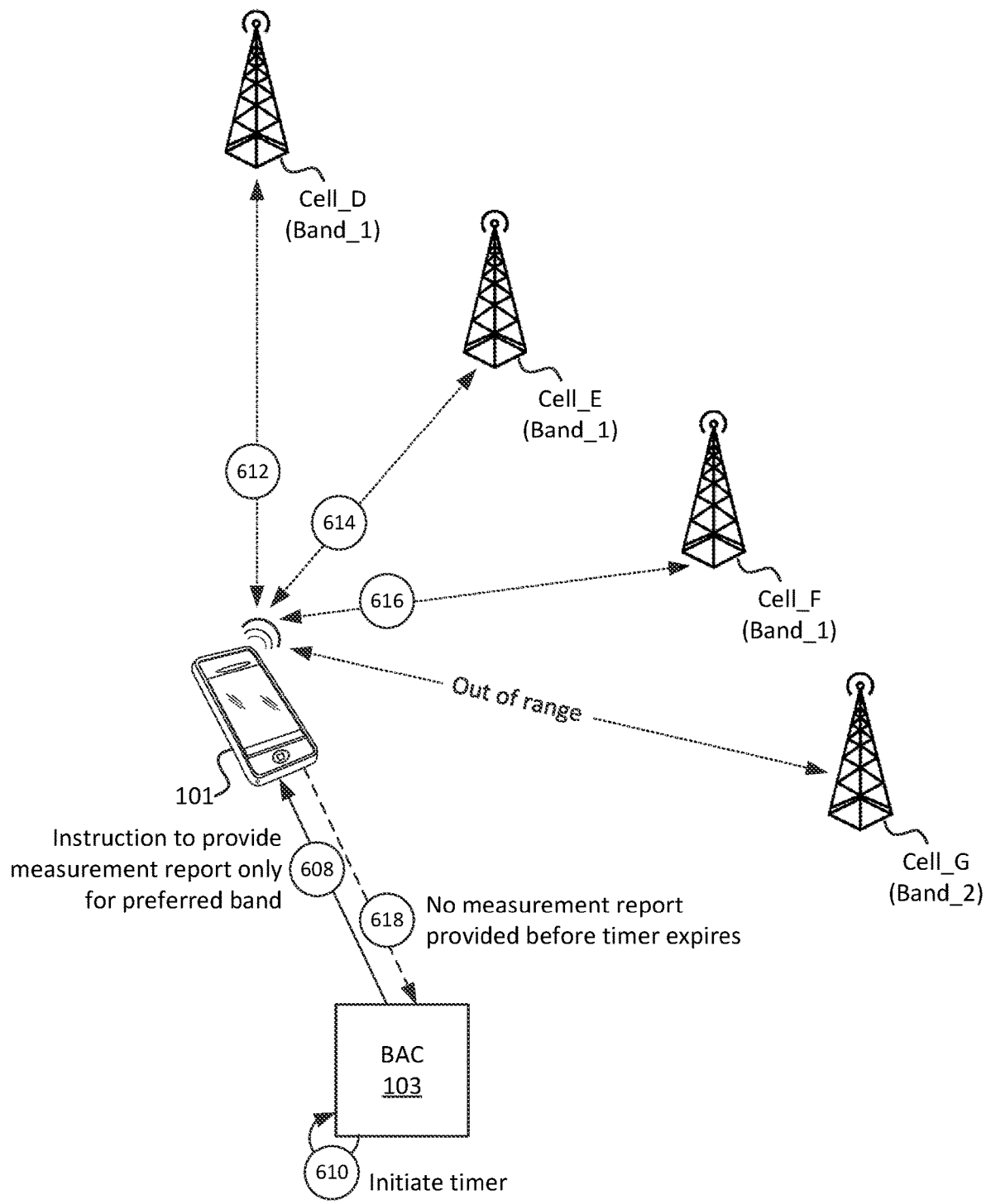
Figure 6C:
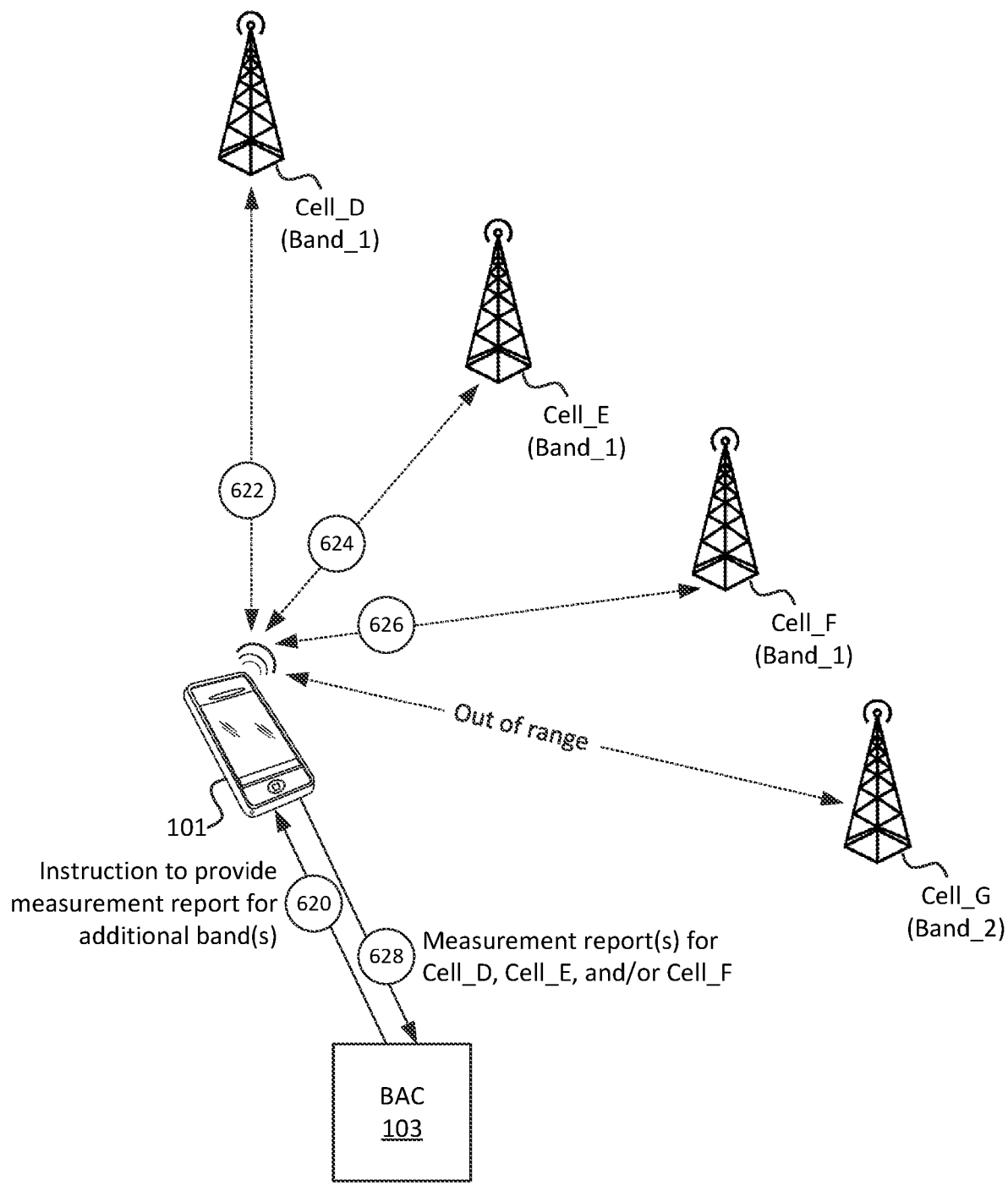

FIGS. 6A-6C illustrate an example in which an instruction is sent to UE 101 to only provide measurement reports for cells that implement a preferred band, but UE 101 is not able to obtain such a measurement report. For example, as shown in FIG. 6A, Cell_D, Cell_E, Cell_F, and Cell_G may be candidate cells for attachment by UE 101 (e.g., BAC 103 and/or some other device or system may store information, such as an NCL, indicating that these cells are candidate cells). In this example, only Cell_G, which is out of range of UE 101, implements the preferred band (e.g., Band_2). In accordance with some embodiments, BAC 103 may provide (at 602) an NCL that includes only candidate cells that implement the preferred band (e.g., only includes Cell_G, in this instance). After outputting the NCL, BAC 103 may initiate (at 604) a timer. Because Cell_G is not in range of UE 101, UE 101 may not be able to locate Cell_G, and may not provide a measurement report to BAC 103 before the timer (initiated at 604) expires (denoted by dashed line 606 in the figure).

FIG. 6B illustrates another example embodiment, in which UE 101 may similarly not provide a measurement report for Cell_G (e.g., due to Cell_G being out of range). As shown, for instance, BAC 103 may provide (at 608) an instruction to provide a measurement report only for cells that implement the preferred band. BAC 103 may also provide an NCL, associated with this instruction, that provides information (e.g., timing information and/or other suitable information) to locate Cell_D, Cell_E, Cell_F, and Cell_G. In some embodiments, UE 101 may scan for and/or locate (at 612, 614, and 616) Cell_D, Cell_E, and Cell_F, but may not locate Cell_G (e.g., due to Cell_G being out of range). Based on the instruction (provided at 608), UE 101 may not provide (at 618) a measurement report before the timer (initiated at 610) expires.

While FIGS. 6A and 6B are discussed in the context of a measurement report not being received from UE 101, in some embodiments, similar concepts may apply when a measurement report is received from UE 101, indicating a signal quality between UE 101 and Cell_G, but the signal quality may be below a threshold signal quality. That is, in these situations, the measurement report indicating the relatively low signal quality may be treated the same as if no measurement report was received at all.

Once the timer has expired (e.g., at 606, depicted in FIG. 6A, or at 618, depicted in FIG. 6B), this may indicate that UE 101 is not in range of any cells that implement the preferred band (e.g., is not in range of Cell_G). Accordingly, BAC 103 may provide (at 620) an instruction to provide a measurement report for cells that implement one or more additional bands. For instance, BAC 103 may instruct UE 101 to also scan for, and provide measurement reports for, cells that implement Band_1 (e.g., in addition to cells that implement Band_2). UE 101 may accordingly scan (at 622, 624, and 626) for Cell_D, Cell_E, and Cell_F, and provide (at 628) measurements reports regarding one or more these cells. Based on these measurement reports, BAC 103 and/or some other device or system may instruct (e.g., via a RRC Reconfiguration message and/or some other suitable message) UE 101 to connect to one of these cells. While not discussed here, BAC 103 (and/or some other device or system) may select one cell based on suitable criteria in instances where measurement reports are received for multiple cells.

Figure 6D:
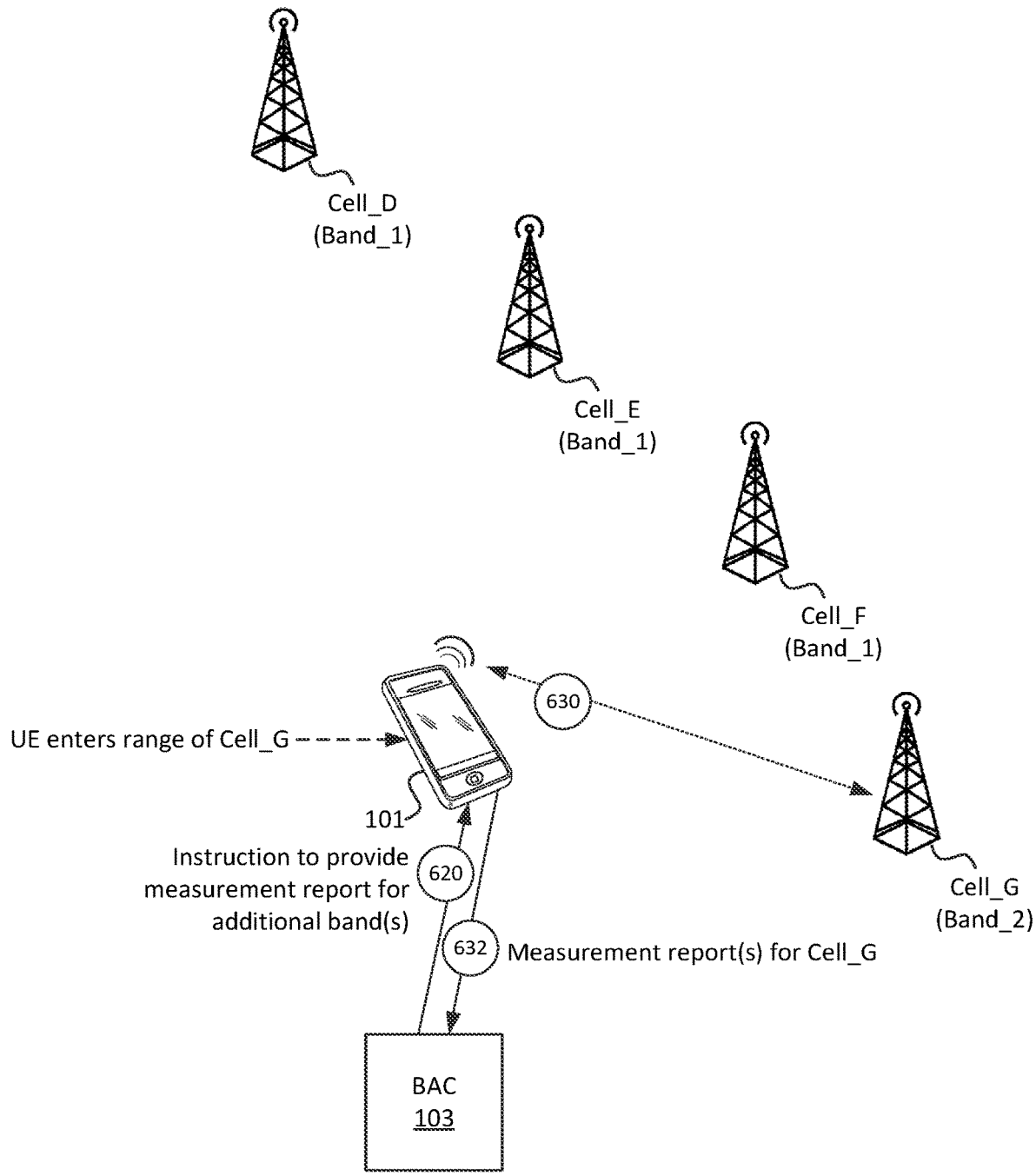
FIG. 6D illustrates an example, in accordance with some embodiments, in which a UE is subsequently able to detect a cell that implements the preferred band after initially not being able to detect a cell that implements the preferred band.

FIG. 6D illustrates an alternate scenario to the one shown in FIG. 6C. As shown in FIG. 6D, UE 101 may enter the range of Cell_G after being instructed (at 620) to provide measurement reports for cells that implement one or more bands in addition to the preferred band. In this scenario, UE 101 may scan for Cell_G (based on the instruction sent at 620) and obtain (at 630) a measurement report for Cell_G. UE 101 may provide (at 632) the measurement report to BAC 103, which may subsequently instruct UE 101 to connect to Cell_G.

Figure 7:
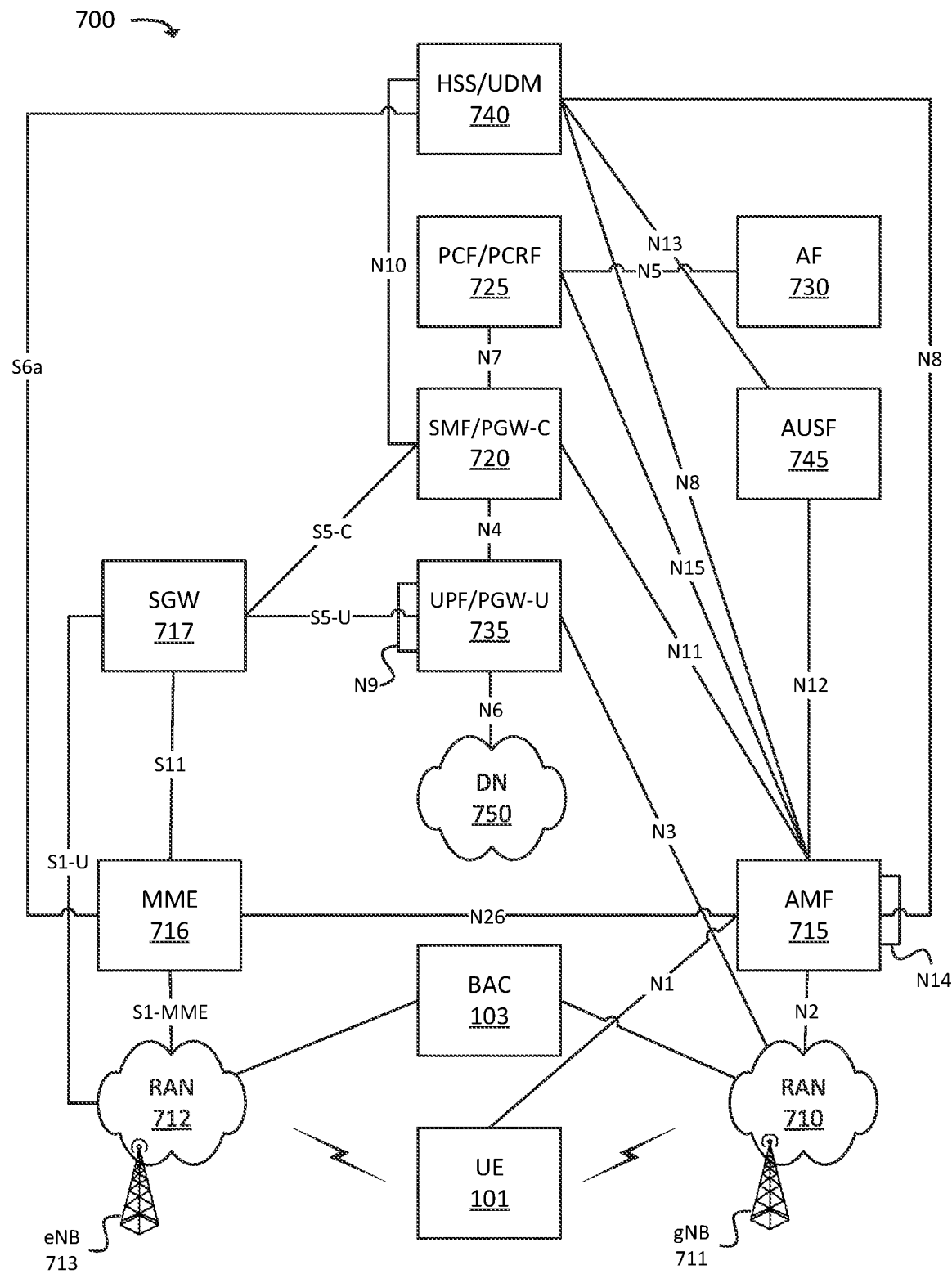
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G RAT may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 700 may include UE 101, radio access network ("RAN") 710 (which may include one or more Next Generation Node Bs ("gNBs") 711), RAN 712 (which may include one or more one or more evolved Node Bs ("eNBs") 713), Access and Mobility Management Function ("AMF") 715, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, Authentication Server Function ("AUSF") 745, BAC 103, and Data Network ("DN") 750.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 101 may include a computation and communication device, such as a wireless mobile communication device that is capable of communicating with RAN 710 and/or DN 750. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 101 may send traffic to and/or receive traffic (e.g., user plane traffic) from DN 750 via RAN 710 and UPF/PGW-U 735.

RAN 710 may be, or may include, a 5G RAN that includes one or more base stations (e.g., one or more gNBs 711), via which UE 101 may communicate with one or more other elements of environment 700. UE 101 may communicate with RAN 710 via an air interface (e.g., as provided by gNB 711). For instance, RAN 710 may receive traffic (e.g., voice call traffic, data traffic, messaging traffic, signaling traffic, etc.) from UE 101 via the air interface, and may communicate the traffic to UPF/PGW-U 735, and/or one or more other devices or networks. Similarly, RAN 710 may receive traffic intended for UE 101 (e.g., from UPF/PGW-U 735, AMF 715, and/or one or more other devices or networks) and may communicate the traffic to UE 101 via the air interface.

RAN 712 may be, or may include, an LTE RAN that includes one or more base stations (e.g., one or more eNBs 713), via which UE 101 may communicate with one or more other elements of environment 700. UE 101 may communicate with RAN 712 via an air interface (e.g., as provided by eNB 713). For instance, RAN 710 may receive traffic (e.g., voice call traffic, data traffic, messaging traffic, signaling traffic, etc.) from UE 101 via the air interface, and may communicate the traffic to UPF/PGW-U 735, and/or one or more other devices or networks. Similarly, RAN 710 may receive traffic intended for UE 101 (e.g., from UPF/PGW-U 735, SGW 517, and/or one or more other devices or networks) and may communicate the traffic to UE 101 via the air interface.

AMF 715 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, and/or to perform other operations. In some embodiments, the 5G network may include multiple AMFs 715, which communicate with each other via the N14 interface (denoted in FIG. 7 by the line marked "N14" originating and terminating at AMF 715).

SGW 517 may include one or more devices, systems, VNFs, etc., that aggregate traffic received from one or more eNBs 713 and send the aggregated traffic to an external network or device via UPF/PGW-U 735. Additionally, SGW 517 may aggregate traffic received from one or more UPF/PGW-Us 735 and may send the aggregated traffic to one or more eNBs 713. SGW 517 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 101. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 101, from DN 750, and may forward the user plane data toward UE 101 (e.g., via RAN 710, SMF/PGW-C 720, and/or one or more other devices). In some embodiments, multiple UPFs 735 may be deployed (e.g., in different geographical locations), and the delivery of content to UE 101 may be coordinated via the N9 interface (e.g., as denoted in FIG. 7 by the line marked "N9" originating and terminating at UPF/PGW-U 735). Similarly, UPF/PGW-U 735 may receive traffic from UE 101 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 101.

BAC 103 may include one or more devices, systems, VNFs, etc., that perform one or more functions described herein. For example, BAC 103 may provide instructions (e.g., via RAN 712 and/or RAN 710) to UE 101 to scan for certain cells according to the bands implemented by the cells (e.g., by sending NCLs and/or other suitable information), maintain one or more timers in accordance with one or more embodiments described herein, and/or perform other functions described herein. In some embodiments, some or all of the functionality of BAC 103 may be performed by eNB 713 and/or gNB 711. In some embodiments, BAC 103 may be a separate device or system that is communicatively coupled with eNB 713 and/or gNB 711.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 101 may communicate, through DN 750, with data servers, other UEs 101, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 101 may communicate.

Figure 8:
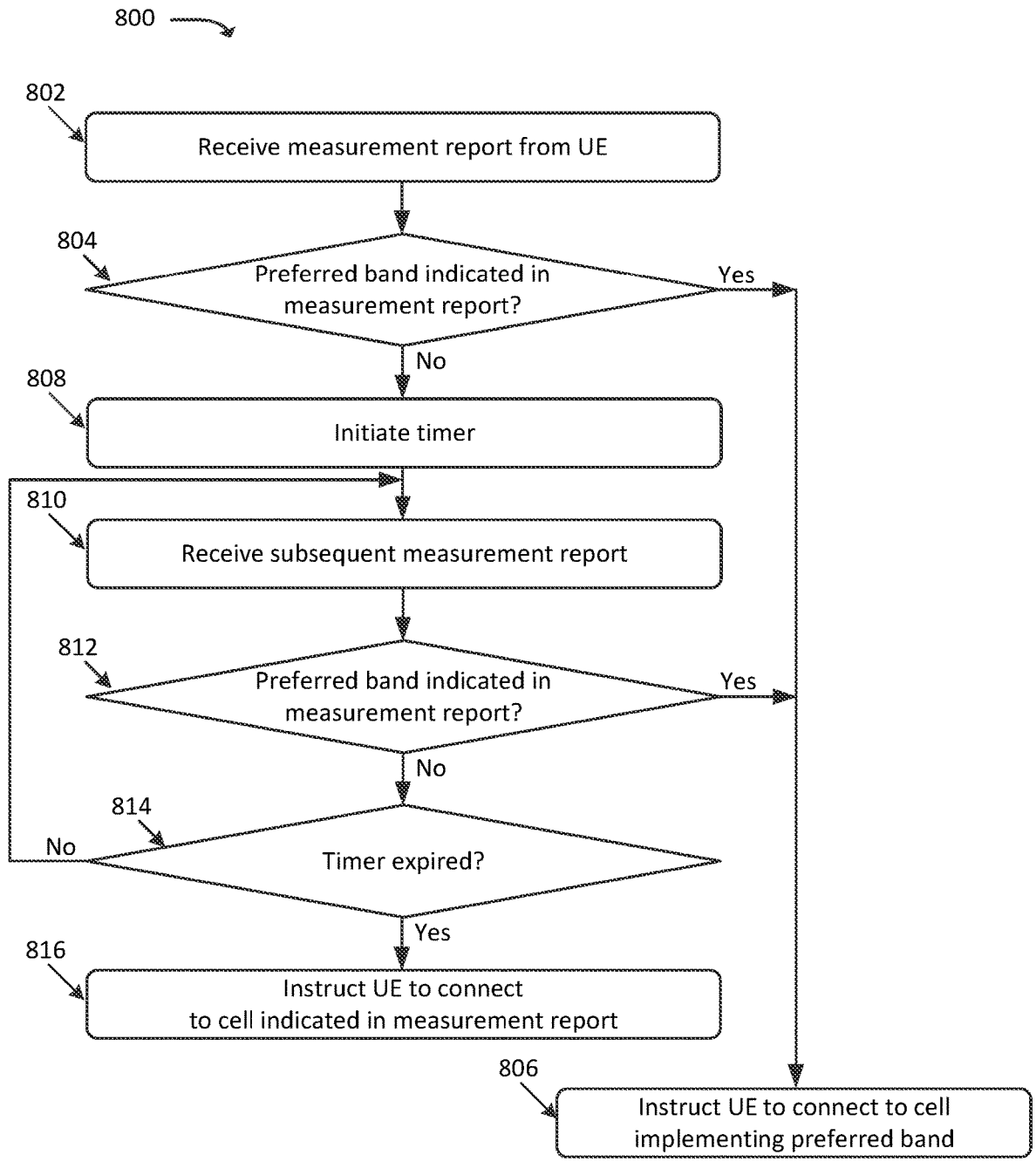
FIG. 8 illustrates an example process for utilizing a timer, in accordance with some embodiments, to facilitate the connection of a UE to a cell that implements a preferred band.

FIG. 8 illustrates an example process 800 for utilizing a timer, in accordance with some embodiments, to facilitate the connection of a UE to a cell that implements a preferred band. In some embodiments, some or all of process 800 may be performed by BAC 103. In some embodiments, one or more other devices may perform some or all of process 800 (e.g., in concert with, and/or in lieu of, BAC 103).

As shown, process 800 may include receiving (at 802) a measurement report from UE 101. For example, BAC 103 may receive (e.g., via a cell to which UE 101 is anchored and/or otherwise connected) a measurement report regarding one or more cells that UE 101 has identified based on performing a scan. UE 101 may have performed the scan based on an NCL and/or some other suitable information indicating potentially available cells (e.g., as provided by BAC 103, by a cell to which UE 101 is anchored and/or otherwise connected, and/or some other device or system).

Process 800 may further include determining (at 804) whether a preferred band is indicated in the measurement report. For example, BAC 103 may determine whether the measurement report indicates a cell that implements a particular band. For example, BAC 103 may perform a lookup on a data structure that correlates cell identifiers (e.g., as indicated in the measurement report) to band(s) implemented by cells corresponding to the cell identifiers, to determine the band(s) implemented by the cell(s) indicated in the measurement report. In some embodiments, BAC 103 may maintain information indicating a preferred band, and/or a ranking of bands (e.g., in which a highest ranking band is the "preferred" band).

If the preferred band is indicated in the measurement report (at 804—YES), then process 800 may additionally include instructing (at 806) UE 101 to connect to a particular cell (indicated in the measurement report) that implements the preferred band. For example, as similarly discussed above, BAC 103 and/or some other device or system (e.g., a cell to which UE 101 is currently anchored and/or otherwise connected) may provide a RRC Reconfiguration message (and/or some other suitable instruction) to UE 101, instructing UE 101 to connect to the particular cell.

If, on the other hand, the preferred band is not indicated in the measurement report (at 804—NO), then process 800 may include initiating (at 808) a timer (e.g., a countdown timer) that has a predetermined expiration. Process 800 may further include receiving (at 810) a subsequent measurement report from UE 101 (e.g., while the timer (initiated at 808) is running). Process 800 may additionally include determining (at 812) whether the preferred band is indicated in the measurement report (e.g., whether a cell indicated in the measurement report implements the preferred band). If the preferred band is indicated in the measurement report (at 812—YES), then process 800 may also include instructing (at 806) UE 101 to connect to the cell implementing the preferred band (e.g., as indicated at the measurement report (received at 810)).

If, on the other hand, the preferred band is not indicated in the subsequent measurement report (at 812—NO), then process 800 may iteratively repeat blocks 810-814 while the timer (initiated at 808) continues to run. For example, BAC 103 may continue to monitor for measurement reports from UE 101. If the timer has expired (at 814—YES) without a measurement report indicating a cell that implements the preferred band, then process 800 may include instructing (at 816) UE 101 to connect to a cell indicated in the measurement report (received at 804, at 810, and/or at some other time), which may not necessarily implement the preferred band.

Figure 9:
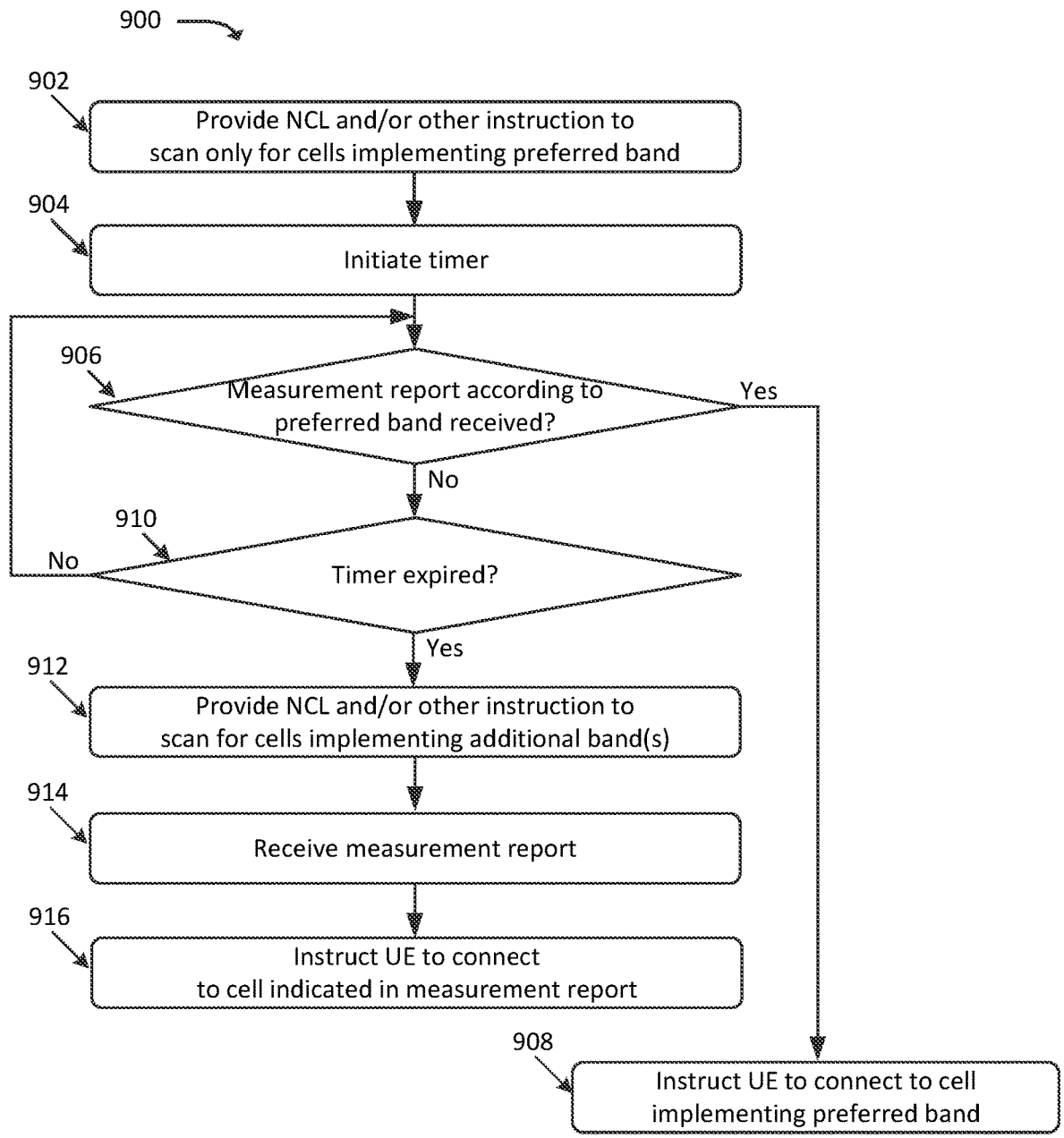
FIG. 9 illustrates an example process for instructing a UE to provide measurement reports for a preferred band.

FIG. 9 illustrates an example process 900 for instructing a UE to provide measurement reports for a preferred band. In some embodiments, some or all of process 900 may be performed by BAC 103. In some embodiments, one or more other devices may perform some or all of process 900 (e.g., in concert with, and/or in lieu of, BAC 103).

As shown, process 900 may include providing (at 902) an NCL and/or other suitable instruction to scan only for cells that implement a preferred band. For example, BAC 103 may output (e.g., via a cell to which UE 101 is anchored and/or otherwise connected) the NCL or instruction to UE 101.

Process 900 may further include initiating (at 904) a timer, which may have a predetermined duration. Process 900 may additionally include determining (at 906) whether a measurement report was received (e.g., prior to the expiration of the timer) according to the preferred band. If a measurement report was received according to the preferred band (at 906—YES), then process 900 may include instructing (at 908) UE 101 to connect to the cell implementing the preferred band.

If, on the other hand, a measurement report was not received (at 906—NO) according to the preferred band, and/or if a measurement report was received that did not satisfy certain criteria (e.g., a threshold measure of signal quality, such as SINR, RSSI, etc.), then process 900 may iteratively repeat blocks 906-910 while the timer (initiated at 904) continues to run. For example, BAC 103 may continue to monitor for measurement reports from UE 101 according to the preferred band. If the timer has expired (at 910—YES) without a measurement report indicating a cell that implements the preferred band, then process 900 may include providing (at 912) an NCL and/or other suitable instruction UE 101, indicating that UE should scan for cells implementing one or more additional bands.

Process 900 may also include receiving (at 914) a measurement report from UE 101. The measurement report may, for example, indicate one or more cells that do not implement the preferred band, but that do implement an additional band indicated in the NCL and/or other instruction (provided at 912). In some embodiments, the measurement report may indicate one or more cells that implement the preferred band (e.g., in situations where a measurement report associated with the preferred band was not received prior to the expiration of the timer, such as when UE 101 moves within range of a cell implementing the preferred band). While not discussed in detail here, BAC 103 may select a particular cell, in situations where measurement reports for multiple cells are received. The selection may be based on whether a given cell implements the preferred band, signal quality between UE 101 and the respective cells, and/or one or more other factors. Process 900 may further include YY8 (at 916) instructing UE 101 to connect to a particular cell indicated in the measurement report (e.g., a selected cell, in situations where multiple cells are indicated).

Figure 10:
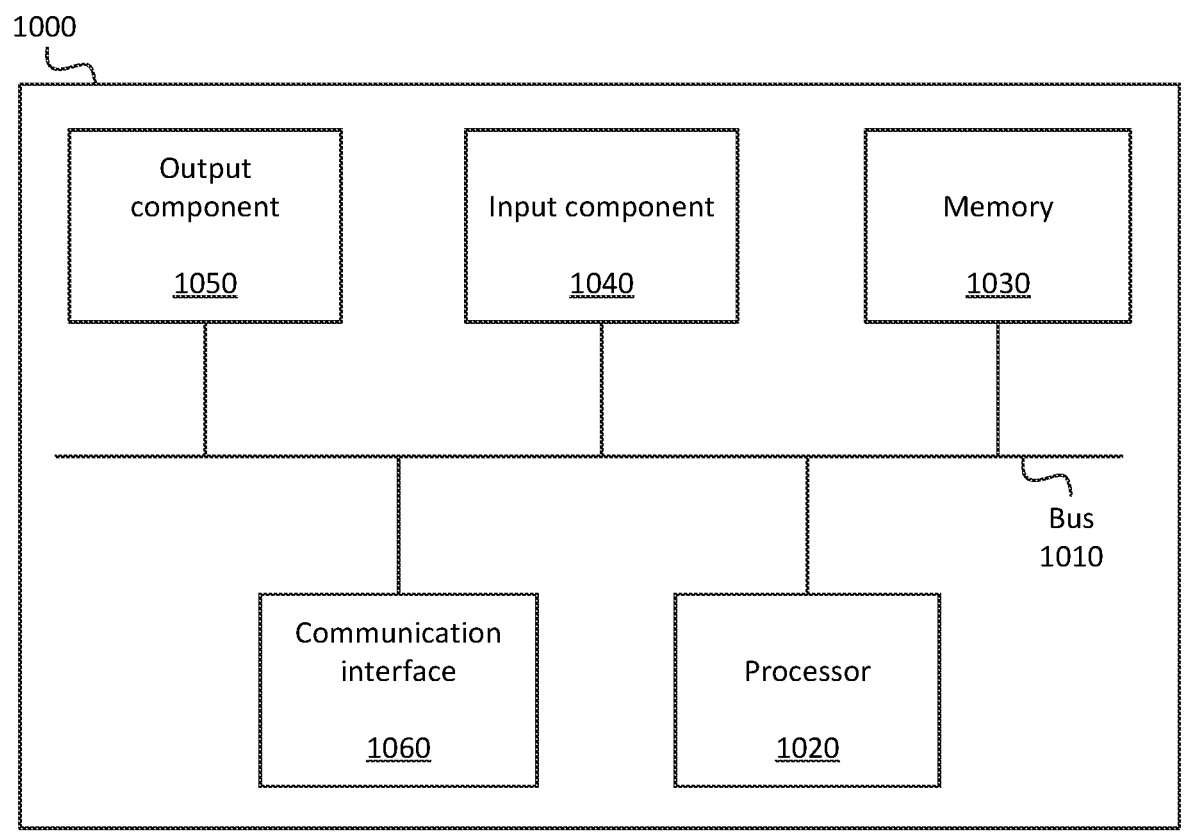
FIG. 10 illustrates example functional components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1, 4-6D, 8, and 9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   receive a first indication that a User Equipment ("UE") has detected a particular cell that is associated with a first radio frequency ("RF") band;
   determine that the first RF band is different from a second RF band;
   based on determining that the first RF band is different from the second RF band, forgo instructing the UE to connect to the particular cell;
   determine that the UE has not provided a second indication, within a threshold duration of time after forgoing instructing the UE to connect to the particular cell, that the UE has detected a cell that is associated with the second RF band; and
   based on determining that the UE has not provided the second indication within the threshold duration of time, instruct the UE to connect to the particular cell.

2. The device of claim 1, wherein the first indication includes a measurement report.

3. The device of claim 1, wherein the UE is a first UE, wherein the particular cell is a first cell, wherein the one or more processors are further configured to:
   receive a third indication that a second UE has detected the first cell that is associated with the first RF band;
   forgo instructing the second UE to connect to the first cell based on receiving the third indication;
   determine that the second UE has provided a fourth indication, within the threshold duration of time after forgoing instructing the second UE to connect to the first cell, that the second UE has detected a second cell that is associated with the first RF band; and
   instruct the second UE to connect to the second cell based on receiving the fourth indication.

4. The device of claim 1, wherein the one or more processors are further configured to:
   receive, within the threshold duration of time after forgoing instructing the UE to connect to the particular cell, a third indication that the UE has detected one or more cells that are associated with one or more RF bands that are different from the second RF band; and forgo instructing the UE to connect to the one or more cells based on receiving the third indication during the threshold duration of time after forgoing instructing the UE to connect to the particular cell.

5. The device of claim 1, wherein forgoing instructing the UE to connect to the particular cell includes waiting for an indication from the UE that the UE has detected one or more cells that are associated with the second RF band.

6. The device of claim 1, wherein instructing the UE to connect to the particular cell, based on determining that the UE has not provided the second indication within the threshold duration of time, includes waiting for the threshold duration of time to elapse.

7. The device of claim 1, wherein the second RF band is a preferred RF band, and wherein the first RF band is a non-preferred RF band.

8. A non-transitory computer-readable medium, storing a plurality of processor-executable instructions to:
receive a first indication that a User Equipment ("UE") has detected a particular cell that is associated with a first radio frequency ("RF") band;
determine that the first RF band is different from a second RF band;
based on determining that the first RF band is different from the second RF band, forgo instructing the UE to connect to the particular cell;
determine that the UE has not provided a second indication, within a threshold duration of time after forgoing instructing the UE to connect to the particular cell, that the UE has detected a cell that is associated with the second RF band; and
based on determining that the UE has not provided the second indication within the threshold duration of time, instruct the UE to connect to the particular cell.

9. The non-transitory computer-readable medium of claim 8, wherein the first indication includes a measurement report.

10. The non-transitory computer-readable medium of claim 8, wherein the UE is a first UE, wherein the particular cell is a first cell, wherein the plurality of processor-executable instructions further include processor-executable instructions to:
receive a third indication that a second UE has detected the first cell that is associated with the first RF band;
forgo instructing the second UE to connect to the first cell based on receiving the third indication;
determine that the second UE has provided a fourth indication, within the threshold duration of time after forgoing instructing the second UE to connect to the first cell, that the second UE has detected a second cell that is associated with the first RF band; and
instruct the second UE to connect to the second cell based on receiving the fourth indication.

11. The non-transitory computer-readable medium of claim 8, wherein the plurality of processor-executable instructions further include processor-executable instructions to:
receive, within the threshold duration of time after forgoing instructing the UE to connect to the particular cell, a third indication that the UE has detected one or more cells that are associated with one or more RF bands that are different from the second RF band; and
forgo instructing the UE to connect to the one or more cells based on receiving the third indication during the threshold duration of time after forgoing instructing the UE to connect to the particular cell.

12. The non-transitory computer-readable medium of claim 8, wherein forgoing instructing the UE to connect to the particular cell includes waiting for an indication from the UE that the UE has detected one or more cells that are associated with the second RF band.

13. The non-transitory computer-readable medium of claim 8, wherein instructing the UE to connect to the particular cell, based on determining that the UE has not provided the second indication within the threshold duration of time, includes waiting for the threshold duration of time to elapse.

14. The non-transitory computer-readable medium of claim 8, wherein the second RF band is a preferred RF band, and wherein the first RF band is a non-preferred RF band.

15. A method, comprising:
receiving a first indication that a User Equipment ("UE") has detected a particular cell that is associated with a first radio frequency ("RF") band;
determining that the first RF band is different from a second RF band;
based on determining that the first RF band is different from the second RF band, forgoing instructing the UE to connect to the particular cell;
determining that the UE has not provided a second indication, within a threshold duration of time after forgoing instructing the UE to connect to the particular cell, that the UE has detected a cell that is associated with the second RF band; and
based on determining that the UE has not provided the second indication within the threshold duration of time, instructing the UE to connect to the particular cell.

16. The method of claim 15, wherein the first indication includes a measurement report.

17. The method of claim 15, wherein the UE is a first UE, wherein the particular cell is a first cell, the method further comprising:
receiving a third indication that a second UE has detected the first cell that is associated with the first RF band;
forgoing instructing the second UE to connect to the first cell based on receiving the third indication;
determining that the second UE has provided a fourth indication, within the threshold duration of time after forgoing instructing the second UE to connect to the first cell, that the second UE has detected a second cell that is associated with the first RF band; and
instructing the second UE to connect to the second cell based on receiving the fourth indication.

18. The method of claim 15, the method further comprising:
receiving, within the threshold duration of time after forgoing instructing the UE to connect to the particular cell, a third indication that the UE has detected one or more cells that are associated with one or more RF bands that are different from the second RF band; and
forgoing instructing the UE to connect to the one or more cells based on receiving the third indication during the threshold duration of time after forgoing instructing the UE to connect to the particular cell.

19. The method of claim 15, wherein forgoing instructing the UE to connect to the particular cell includes waiting for an indication from the UE that the UE has detected one or more cells that are associated with the second RF band.

20. The method of claim 15, wherein instructing the UE to connect to the particular cell, based on determining that the UE has not provided the second indication within the threshold duration of time, includes waiting for the threshold duration of time to elapse.

* * * * *